March 20, 1945. S. SCHNELL 2,372,023
YIELDABLE DEVICE
Filed Aug. 26, 1942 2 Sheets-Sheet 1

INVENTOR
S. SCHNELL
BY
*E. F. Huffman*
ATTORNEY

March 20, 1945.    S. SCHNELL    2,372,023
YIELDABLE DEVICE
Filed Aug. 26, 1942    2 Sheets-Sheet 2
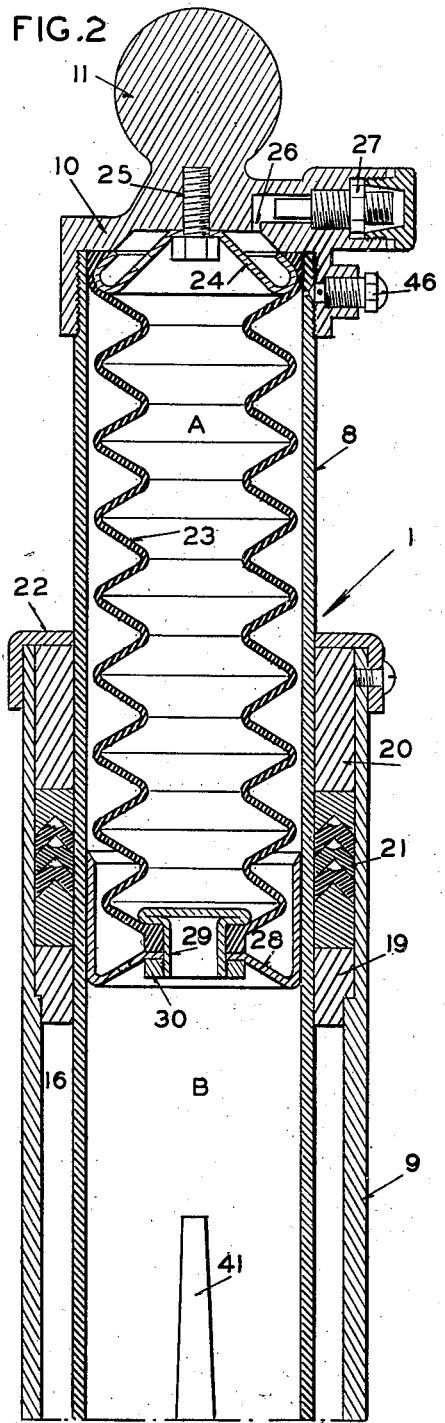
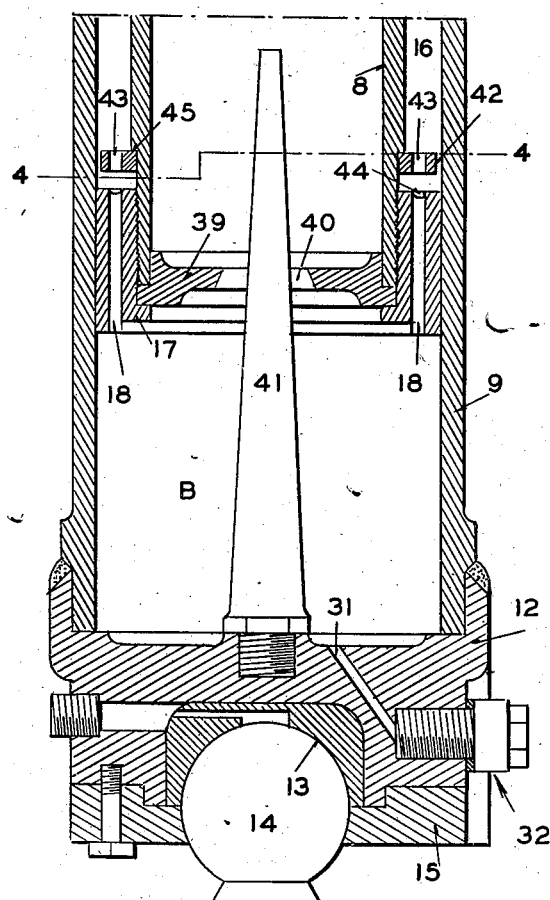
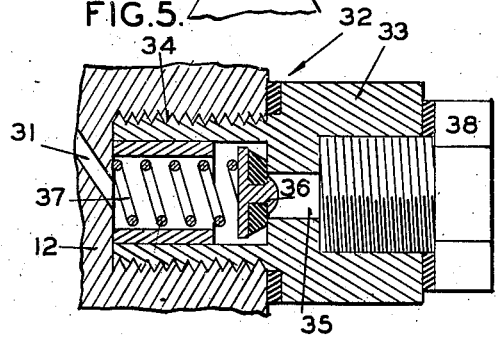
INVENTOR
S. SCHNELL
BY
J. E. Huffman
ATTORNEY Patented Mar. 20, 1945

2,372,023

UNITED STATES PATENT OFFICE 2,372,023

YIELDABLE DEVICE

Steve Schnell, Kirkwood, Mo., assignor to Wagner Electric Corporation, St. Louis, Mo., a corporation of Delaware Application August 26, 1942, Serial No. 456,156

5 Claims. (Cl. 267—64)

My invention relates to improvements in yieldable devices and more particularly to that type of device in which relatively movable members maintain a body of non-compressible fluid and a body of compressible fluid under pressure with said fluids being separated by a movable wall.

One of the objects of my invention is to provide, in a yieldable device of the type referred to, improved means for separating the fluids.

Another object of my invention is to so construct a yieldable device of the type referred to that it will be simple in construction, efficient in operation, and also easy to condition for proper operation.

Figure 1:
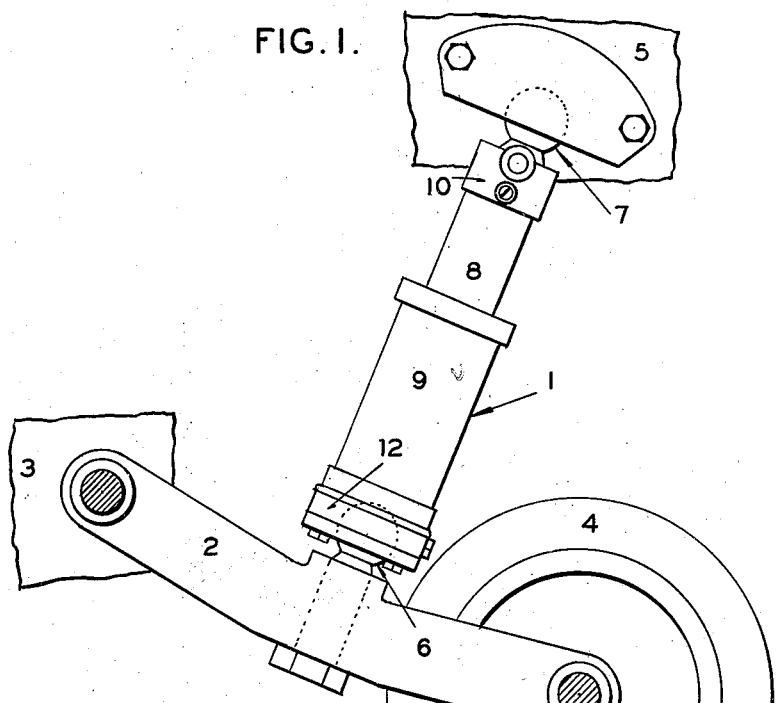
Figure 4:
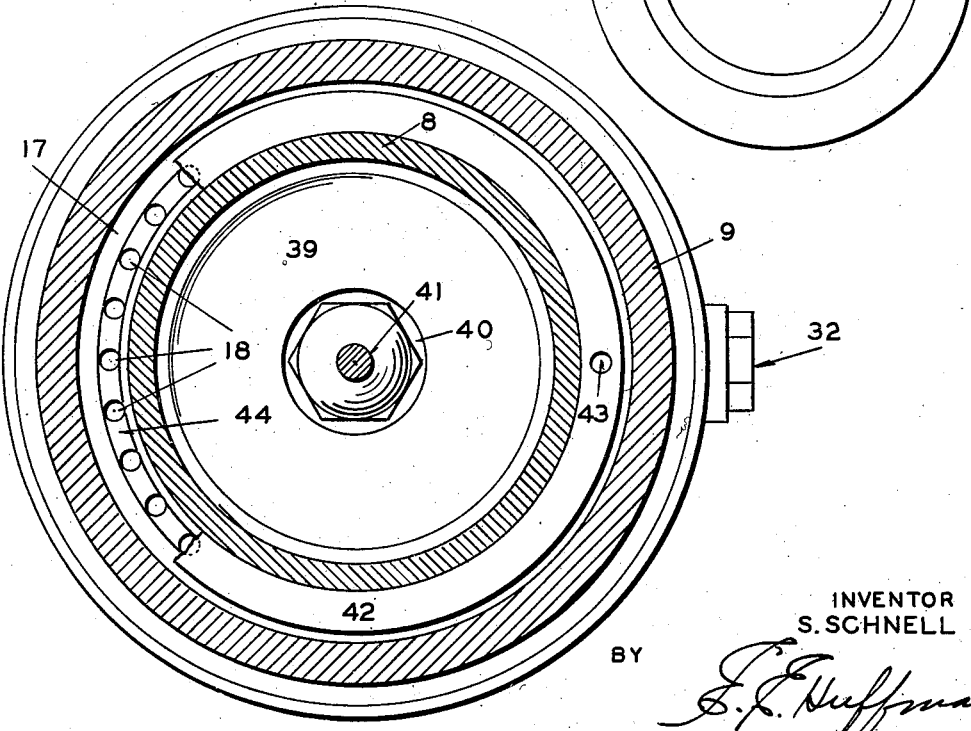

Other objects of my invention will become apparent from the following description taken in connection with the accompanying drawings in which Figure 1 is a view of my improved yieldable device showing it being employed as a strut between a wheel and body of a vehicle; Figures 2 and 3 are longitudinal sectional views of the upper and lower parts of the yieldable device showing the inner construction thereof; Figure 4 is a sectional view taken on the line 4—4 of Figure 3; and Figure 5 is an enlarged sectional view of the filler plug construction.

Referring to the drawings in detail and first to Figure 1, I have shown my improved yieldable device 1 employed, by way of example, as a strut between a wheel of a vehicle and the chassis or body thereof. However, it is noted that the device may be used wherever it is desired to have a yieldable support, a suspension device, a rebound control device, a shock absorbing device, an energy storing device, and so forth. As shown in Figure 1, arm 2 is pivoted at one end to a part of the chassis or body 3 of a vehicle and its other end has rotatably mounted thereon a wheel 4. Between arm 2 and another body part 5 of the vehicle there is interposed the device or strut 1, the connection being made by ball and socket connections 6 and 7.

The yieldable device or strut 1 is shown in detail in Figures 2, 3, 4 and 5, reference to which is now made. The strut is composed of two telescoping cylinders 8 and 9, the former being closed at its upper end by a cap 10 provided with a ball 11 forming part of the ball and socket connection 7 and the latter being closed at its lower end by a cap 12 provided with a socket 13 for receiving ball 14 of the ball and socket connection 6, said ball being held in the socket by a plate 15. The external diameter of cylinder 8 is somewhat less than the internal diameter of cylinder 9, thus producing a chamber 16 between the walls of the two cylinders. The lower end of cylinder 8, which is received in cylinder 9, carries a sleeve 17 which has such an external diameter as to snugly fit in cylinder 9 so as to properly guide the lower end of cylinder 8. This sleeve is provided with a plurality of circumferentially spaced openings 18 for placing chamber 16 in communication with the interior of cylinder 9 below the sleeve.

The upper end of cylinder 9 carries bearing sleeves 19 and 20 between which is interposed suitable annular packing means 21 to prevent fluid from leaking past the two cylinders yet permitting the cylinders to have relative axial movement. The bearing sleeves and packing means are held in position by a retaining cap 22 secured to the upper end of cylinder 9.

Within the upper part of cylinder 8 there is positioned an annular corrugated diaphragm or bellows like member 23 made of rubber, synthetic rubber, or any other suitable material. The upper end of the diaphragm is clamped to the extreme upper end of the cylinder and the cap 10 by a member 24 held in clamping position by a bolt 25. This end of the diaphragm communicates with an inlet passage 26 in the cap, which passage is controlled by an ordinary air pressure valve 27. The lower end of diaphragm 23 is secured to a piston like guide member 28 having a loose fit in the cylinder and forming no obstruction to interchange of fluid from opposite sides thereof. The connection between the lower end of the diaphragm and member 28 comprises a threaded member 29, for closing the open end thereof, and nut 30. The diaphragm 23 is of such molded length that it can be stretched and compressed a considerable longitudinal distance. Thus it is seen that by means of the corrugated diaphragm there is provided in the cylinders two chambers A and B comprising the interior of the diaphragm, and the latter comprising all the space in the two cylinders which is not within the diaphragm. Chamber B is to be filled with a suitable non-compressible fluid, such as oil, hydraulic brake fluid, or the like, and chamber A is to be filled with a compressible fluid under pressure, preferably air. With chamber A containing a compressible fluid, the pressures existing in both chambers will be the same since the diaphragm acts solely as a partition between the two bodies of fluid.

The chamber B is adapted to be filled with fluid through an inlet passage 31 in cap 12 at the lower end of cylinder 9. This passage is controlled by a filler plug construction generally indicated by the numeral 32 which, as shown in Figure 5, comprises a member 33 threaded into a threaded opening 34 and having a passage 35. This passage 35 is controlled by a check valve in the form of a valve element 36 and a spring 37, said check valve preventing fluid from flowing out of chamber B through passages 31 and 35 but not preventing fluid from being forced into chamber B when under a slight pressure. As a safety feature to prevent any fluid from coming out of chamber B, due to leakage of valve element 36, there is provided a plug 38 screwed into the outer end of passage 35.

In order that the cushioning or shock absorbing action of the compressible fluid may be properly controlled when cylinder 8 moves inwardly with respect to cylinder 9, metering means is provided between the lower ends of the cylinder. This means comprises a wall 39 clamped to the lower end of cylinder 8 by sleeve 17, said wall being provided with a central opening 40. Cooperating with this opening is a tapered pin 41 carried by cap 12 and extending into the lower part of cylinder 9 along its axis. The taper of the pin is such that the area of the opening 40 will be decreased as cylinder 8 moves inwardly with respect to cylinder 9. Thus it is seen that by this arrangement as the cylinder 8 moves inwardly, the rate of flow of fluid between the lower part of cylinder 9 and the lower part of cylinder 8 will be decreased, thereby progressively decreasing the rate of movement of cylinder 8 inwardly. It is also noted that by this action increasing of the pressure of the fluid in chamber A will be gradual, thereby causing the proper shock absorbing action.

When cylinder 8 moves inwardly with respect to cylinder 9 the volume of chamber 16 between the two cylinders increases and fluid flows through the plurality of passages 18. However, when cylinder 8 moves outwardly with respect to cylinder 9, the metering action through opening 40 is not effective and in order to control the outward movement of cylinder 8, a control ring 42 is provided which is adapted to cooperate with the top of sleeve 17. This ring has two diametrically positioned openings 43 and in order that these openings may communicate with all the passages 18 when the ring is seated, there is provided an annular groove 44 at the top of sleeve 17 which connects with all the passages. Thus when cylinder 8 moves outwardly with respect to cylinder 9, ring 40 will seat on the top of sleeve 17 and all fluid which flows from chamber 16 to the lower end of cylinder 9 must pass only through the two openings 43. The ring, however, does not interfere with the movement of the fluid from the lower end of cylinder 9 to chamber 16 when cylinder 8 moves relatively inwardly with respect to cylinder 9 since under these conditions the fluid flowing through the passages 18 will unseat the ring. The upward movement of the ring is limited by a shoulder 45.

In filling the yieldable device the cylinders 8 and 9 are first separated as far as possible. Next, just a sufficient amount of air under pressure is placed within chamber A to elongate the diaphragm and cause the piston like member 28 to engage with wall 39 at the lower end of cylinder 8. The filler plug 38 is now moved and the non-compressible fluid under slight pressure forced into chamber B. When this chamber is completely filled, there will be fluid in surrounding relation to the diaphragm 23 and also within chamber 16. In order that all the air may be expelled from chamber B during the filling operation, there is provided a bleeder plug 46 at the top end of cylinder 8, this being opened during the filling operation. If there should be some air trapped in chamber 16 during the filling operation, this can be freed by moving cylinders 8 and 9 relatively to each other. After chamber B is filled and all air expelled, the bleeder plug 46 is closed and safety plug 38 screwed into sealing position. Additional air under pressure is next placed in chamber A so that proper operation can take place. When the device is used as a strut on a vehicle, this amount of air will be sufficient to have the cylinder 8 telescoped in cylinder 9 about half way.

With the yieldable device filled with the two fluids as described, said fluids will be confined to their respective chambers and there will be no possibility of them becoming mixed. The diaphragm will not collapse in any way due to the fact that the pressures in chambers A and B will always be equal.

With the strut in operative condition when wheel 4 moves over uneven surfaces, cylinders 8 and 9 will have relative movement with each other due to the fact that the force acting on the yieldable device will vary. As the force increases, cylinder 8 will be moved inwardly with respect to cylinder 9. This will cause fluid to flow into chamber 16 from the lower end of cylinder 9 and also from this lower end of cylinder 9 into the lower end of cylinder 8 since when cylinder 8 moves into cylinder 9 it will displace fluid and the only place it can go is into chamber 16 and the lower end of cylinder 8 which has a yieldable wall. The fluid flowing into cylinder 8 results in a decrease in the volume of chamber A and consequently diaphragm 23 will be shortened. The shortening of the diaphragm will increase the pressure of the air in chamber A and thereby cause an added resistance to the downward movement of cylinder 8 with respect to cylinder 9. Thus the compressing of the air cushions the vehicle. This cushioning is controlled by decrease of the rate of flow of fluid through opening 40, particularly when the forces tending to move the cylinders inwardly toward each other are as great as when the vehicle passes over a large obstruction or an embankment. When wheel 4 and the body of the vehicle move relatively away from each other, cylinder 8 will be moved outwardly with respect to cylinder 9 but the rate of outward movement will be controlled by the two openings 43 in ring 42. Thus there is no possibility of the cylinders being completely separated to their fullest extent by any rapid movement.

From the foregoing it is seen that by the use of the annular corrugated diaphragm the two fluids in chambers A and B will be positively maintained separated and without any possibility of there being unequal pressures in the two chambers A and B as the collapsing and distending of the diaphragm is completely without friction. The length of the diaphragm permits the cylinders to have their full relative movement and because of the number of corrugations, there will be no strain on the material. This arrangement also facilitates easy and proper filling of the two chambers so that the yieldable device can be conditioned for proper operation. The diaphragm 23 is so constructed that when it is completely elongated with the piston like member 28 in engagement with wall 39 and the cylinders separated to their fullest extent, chamber B will have a volume equal to the correct volume of non-compressible fluid for the device. Thus there will be no possibility of getting too much or too little non-compressible fluid in chamber B. The necessity of measuring the fluid before filling chamber B is eliminated.

Being aware of the possibility of modifications in the particular structure herein described without departing from the fundamental principles of my invention, I do not intend that its scope be limited except as set forth by the appened claims.

Having fully described my invention, what I claim as new and desire to secure by Letters Patent of the United States is:

1. In a yieldable device for interpositioning between two members having relative movement, two telescoping cylinders closed at their outer ends, a single annular corrugated diaphragm secured at one end to the outer end of one of the cylinders and closed at the other end, said diaphragm providing by axial elongation and contraction a variable sealed chamber between its walls and within said one cylinder, a substantially non-compressible fluid filling the space in the cylinders which is exterior to the diaphragm, a compressible fluid under pressure in the chamber formed by the diaphragm, and means comprising an element carried by each cylinder for progressively restricting the flow of the non-compressible fluid between the cylinders as they move relatively inwardly.

2. In a yieldable device for interpositioning between two members having relative movement, two telescoping cylinders closed at their outer ends, a single annular corrugated diaphragm secured at one end to the outer end of one of the cylinders and closed at the other end, said diaphragm providing by axial elongation and contraction a variable sealed chamber within said one cylinder, a substantially non-compressible fluid filling the space in the cylinders which is exterior to the diaphragm, a compressible fluid under pressure in the chamber formed by the diaphragm, means comprising an element carried by each cylinder for progressively restricting the flow of the non-compressible fluid between the cylinders as they move relatively inwardly, and means for checking the rate of separation as the cylinders move relatively outwardly.

3. In a yieldable device for interpositioning between two members having relative movement, two telescoping cylinders having their outer ends closed, means comprising a corrugated member secured at one end to the outer end of the inner cylinder and closed at its other end, said member providing by axial elongation and contraction a variable chamber, a substantially non-compressible fluid filling the space in the cylinders which is exterior to the corrugated member including its side wall, a compressible fluid under pressure in the chamber formed by said corrugated member, a wall carried by the inner end of the inner cylinder and provided with an opening, and a tapered pin carried by the outer cylinder and extending through the wall opening to provide a progressively decreasing passage between the cylinders as they move relatively toward each other from any point where the pin is received in the opening.

4. In a yieldable device for interpositioning between two members having relative movement, two telescoping cylinders having their outer ends closed, means comprising an annular corrugated member secured at one end to the outer end of the inner cylinder and closed at its other end to provide an axial elongation and contraction a variable chamber, a substantially non-compressible fluid filling the space in the cylinders which is exterior to the corrugated member, a compressible fluid under pressure in the chamber formed by asid corrugated member, a wall carried by the inner end of the inner cylinder and provided with an opening, a tapered pin carried by the outer cylinder and extending through the wall opening to provide a progressively decreasing passage between the cylinders as they move relatively toward each other, and means carried by the closed end of the corrugated member for guiding it in the inner cylinder and for preventing damage thereto by the pin, said last named means permitting the non-compressible fluid to flow to the space surrounding the corrugated member.

5. In a yieldable device for interpositioning between two members having relative movement, two telescoping cylinders closed at their outer ends, an annular corrugated element positioned axially in one of the cylinders, means for connecting one end of the element in sealed relation to the closed end of the cylinder in which it is positioned, the other end of said element being axially remote from the attached end and capable of free movement in the cylinder, means for sealing said other end of the element to thus provide in the cylinder a separate chamber the volume of which corresponds to the volume within the outlines of the element between its ends and is capable of being varied by elongation and contraction of the element and a movement of the sealed end relative to the connected end, a guide carried by the sealed end and cooperating with the cylinder wall, a substantially non-compressible fluid in the cylinders and surrounding the exterior of the element, and a compressible fluid under pressure in the separate chamber provided by the element.

STEVE SCHNELL.